US005873579A

United States Patent [19]

Prokop et al.

[11] Patent Number: 5,873,579

[45] Date of Patent: Feb. 23, 1999

[54] PROTECTIVE DEVICE FOR A FLUID-OPERATED PERCUSSION TOOL

[75] Inventors: Heinz-Jürgen Prokop, Essen; Karlheinz Fritz, Sprockhövel; Thomas Deimel, Essen; Martin Schareina, Gelsenkirchen; Thorsten Ahr, Essen, all of Germany

[73] Assignee: Krupp Bautechnik GmbH, Essen, Germany

[21] Appl. No.: 895,237

[22] Filed: Jul. 16, 1997

[30] Foreign Application Priority Data

Jul. 17, 1996 [DE] Germany ........................ 196 28 815.0

[51] Int. Cl.[6] ........................ B23B 5/22

[52] U.S. Cl. ........................ 279/19; 175/296; 175/298; 175/414; 175/417; 279/19; 279/19.6; 279/19.7

[58] Field of Search ........................ 279/19; 175/296, 175/297, 298, 414, 417, 321

[56] References Cited

U.S. PATENT DOCUMENTS

| | | | |
|---|---|---|---|
| 2,764,138 | 9/1956 | Wahlsten et al. | 173/114 |
| 4,434,859 | 3/1984 | Rumpp et al. | 279/19.4 |
| 4,694,911 | 9/1987 | Kennedy | 17/417 |
| 4,700,956 | 10/1987 | Rohm | 279/19.4 |
| 5,301,761 | 4/1994 | Fu et al. | 175/296 |
| 5,445,232 | 8/1995 | Brannstrom et al. | 175/417 |
| 5,562,170 | 10/1996 | Wolfer et al. | 175/296 |

FOREIGN PATENT DOCUMENTS

| | | |
|---|---|---|
| 16 78 280 | 8/1953 | Germany . |
| 34 40 530 | 5/1985 | Germany . |
| 36 06 331 | 9/1987 | Germany . |
| 91 15 805 | 5/1993 | Germany . |

*Primary Examiner*—Andrea L. Pitts
*Assistant Examiner*—Monica Smith
*Attorney, Agent, or Firm*—Venable; Gabor J. Kelemen

[57] ABSTRACT

A percussion tool includes a housing part having a frontal end provided with an opening; a tool bit guide supported in alignment with the opening; and a tool bit slidably supported in the tool bit guide and projecting from the housing part through the opening. The tool bit is arranged for a reciprocating motion parallel to the longitudinal tool bit axis and transverse excursions substantially perpendicular to the tool bit axis. A transverse guide is attached to the housing part and displaceably receives an outer seal composed of a transverse slide. The transverse slide has an aperture through which the tool bit passes. The transverse slide and the tool bit are arranged such that the transverse slide and the tool bit move as a unit during the transverse excursions of the tool bit. There is further provided an inner seal disposed in the housing part between the transverse slide and the tool bit guide externally thereof. The inner seal surrounds the tool bit and is in a resilient contacting relationship therewith.

16 Claims, 2 Drawing Sheets

PROTECTIVE DEVICE FOR A FLUID-OPERATED PERCUSSION TOOL

CROSS REFERENCE TO RELATED APPLICATION

This application claims the priority of German Application No. 196 28 815.0 filed Jul. 17, 1996, which is incorporated herein by reference.

BACKGROUND OF THE INVENTION

This invention relates to a protective device which finds application in a fluid-operated percussion tool and is of the type that has a housing portion which is coupled with the percussion tool and which shields the latter at least from the front against external effects. A tool bit driven by the percussion tool extends into the housing portion which, at its passage for the tool bit, has an external seal surrounding the tool bit with a small clearance transversely to the longitudinal tool bit axis and is movable transversely to the tool bit axis.

Fluid-driven percussion tools whose tool bit is usually a one-piece, chisel-like member are preponderantly used for breaking up rocks or stone formations. During such an operation, apart from large pieces of broken material, stone dust and grains of a few mm of diameter are also obtained. Since such a stone dust in most cases contains abrading material (such as quartz), its penetration into the tool bit guide causes an increased wear and possibly a premature breakdown of the structural elements.

For the protection of the tool bit guide against the penetration of dirt it has been known to use elastic sealing elements which, by being urged with their contact faces against the tool bit, seek to prevent penetration of small-size dirt (even down to dust consistency) . Such protective devices are, however, easily damaged during heavy duty use and further, they are exposed to significant wear due to the continuous reciprocating motion of the tool bit.

German Offenlegungsschrift (application published without examination) 34 40 530 describes a machine-guided percussion tool of the earlier-discussed type which is entirely encapsulated and has an outwardly shielding, disk-like damping element externally of the tool bit (chisel) guide. The percussion tool proper is countersupported by the surrounding housing with the interposition of elastic damping elements.

SUMMARY OF THE INVENTION

It is an object of the invention to provide an improved protective device for a fluid-driven percussion tool which operates well even under heavy duty conditions.

It is a further, particular object of the invention to increase the operational safety of the percussion tool by reducing the wear in the region of the tool bit guide and, at the same time, to reduce the amount of repair and maintenance work.

These objects and others to become apparent as the specification progresses, are accomplished by the invention, according to which, briefly stated, the percussion tool includes a housing part having a frontal end provided with an opening; a tool bit guide supported in alignment with the opening; and a tool bit slidably supported in the tool bit guide and projecting from the housing part through the opening. The tool bit is arranged for a reciprocating motion parallel to the longitudinal tool bit axis and for transverse excursions substantially perpendicular to the tool bit axis. A transverse guide is attached to the housing part and displaceably receives an outer seal composed of a transverse slide. The transverse slide has an aperture through which the tool bit passes. The transverse slide and the tool bit are arranged such that the transverse slide and the tool bit move as a unit during the transverse excursions of the tool bit. There is further provided an inner seal disposed in the housing part between the transverse slide and the tool bit guide externally thereof. The inner seal surrounds the tool bit and is in a resilient contacting relationship therewith.

The invention is based on the principle to provide the percussion tool in a location downstream of the tool bit guide - as viewed in the impacting direction - with an external seal constituted by a movably supported transverse slide, adjoined, upstream thereof, by an elastic inner seal countersupported by the tool bit.

While the transverse slide is effective as a mechanical shield and simultaneously serves as a preliminary dirt stripper, the inner seal adjoining the transverse slide prevents penetration of finer dirt in the region of the tool bit guide.

The percussion tool itself may be of any desired configuration as long as it has a reciprocating tool bit guided in a tool bit guide and driven by the percussion drive.

The protective device according to the invention is, in further detail, characterized in that the outer seal is formed as a transverse slide supported in a transverse guide and is entrained into motion by the tool bit during transverse excursions thereof. Further, the outer seal is adjoined, upstream thereof as viewed in the impacting direction, by an inner seal which engages the tool bit elastically, externally of the tool bit guide and further, the outer and inner seals are each replaceably secured to a respective carrier component.

The transverse slide may be made of metal or plastic, dependent on requirements. What is of importance is the provision of such a configuration for the transverse slide which ensures that it is movable as a unit with the tool bit in the transverse direction to a sufficient extent; that is, in case of transverse displacements of the tool bit, the latter may shift the transverse slide in the transverse guide. It is a condition for such an operation that the transverse slide has, in the region of its aperture (passage) provided for the tool bit, a shape which even in case of an oblique positioning of the tool bit, does not allow for a jamming of the transverse slide.

According to a particularly simple embodiment of the invention, the transverse slide is disk-shaped and has a sufficient stiffness in the longitudinal direction of the percussion tool bit.

According to a further advantageous feature of the invention, the wall of the transverse slide defining the aperture for the transverse slide has a convex shape curving toward the throughgoing tool bit.

According to a further feature of the invention, the transverse slide forms a rigid unit.

It is feasible to make the transverse slide of several materials; in particular, it may be configured such that the wall defining the passage for the percussion tool bit is made of an elastic material whereas the other parts of the transverse slide are rigid. For resilient materials particularly rubber-like substances or synthetic materials may be considered.

According to a further advantageous feature of the invention, the transverse slide has, along its wall defining the aperture for the tool bit, an elastic insert which at least in part forms the aperture wall for the passage of the tool bit. The elastic insert may be so dimensioned and configured that it lies against the tool bit and thus forms an additional seal.

An additional operational noise of the percussion tool is held within acceptable limits by providing according to a further feature of the invention that the transverse slide is elastically supported in a direction transversely to the impacting direction. By virtue of such an elastic support, the transverse slide seeks to assume a predetermined mid position and is thus laterally countersupported to a substantial extent by the percussion tool bit.

According to a particularly maintenance-friendly feature of the invention, the transverse slide forms, with the transverse guide, a replaceable unit which is releasably secured to the housing part.

In accordance with a further feature of the invention, the inner seal is so structured that it has at least one sealing lip engaging the percussion tool bit.

According to a further feature of the invention, at least one sealing lip of the inner seal is arranged at an inclination to the impacting direction to prevent penetration of dirt into the region of the tool bit guide.

According to a further feature of the invention, the inner seal is so configured that the ratio of the length of the sealing lip to the largest possible transverse displacement of the tool bit is at least between 1 and 3.

To the extent that other geometrical and structural details permit, the inner seal may be secured to any desired component of the entire percussion assembly.

According to a particularly simple embodiment of the invention, the inner seal is attached to an extension of the tool bit guide and the extension in the region of the inner seal of the tool bit surrounds the latter with a clearance which is greater than the largest possible transverse displacement of the tool bit.

The housing part which carries at least the transverse slide may form part of the percussion tool itself.

The invention may also find application in devices where the housing part is a component of an outer housing supporting the percussion tool. In such a case the housing part forms the frontal closing portion of the outer housing of the percussion tool components.

Preferably, the inner seal is arranged in such a manner relative to the tool bit guide that the distance of the sealing lip from the frontal edge of the tool bit guide (that is, from that end portion of the tool bit guide which is oriented towards the transverse slide) is greater than the maximum stroke of the tool bit. In this manner it is ensured that the contacting region of the sealing lip does not coincide with the guide region of the tool bit.

In the region of the frontal edge of the tool bit guide the tool bit is exposed to particularly high stresses which may result in damages to the outer surface of the tool bit. By means of the above-noted configuration of the inner seal the sealing lip of the inner seal is prevented from contacting the outer (exposed) surface of the tool bit to thus protect the latter from premature damage or destruction.

For enhancing a maintenance-friendly behavior, the inner seal should be arranged relative to the outer seal (that is, the transverse slide) in such a manner that it is readily accessible from the outside and may be disassembled if required after removal of the transverse slide or the replacement component surrounding it.

DESCRIPTION OF THE PREFERRED EMBODIMENTS

Figure 1:
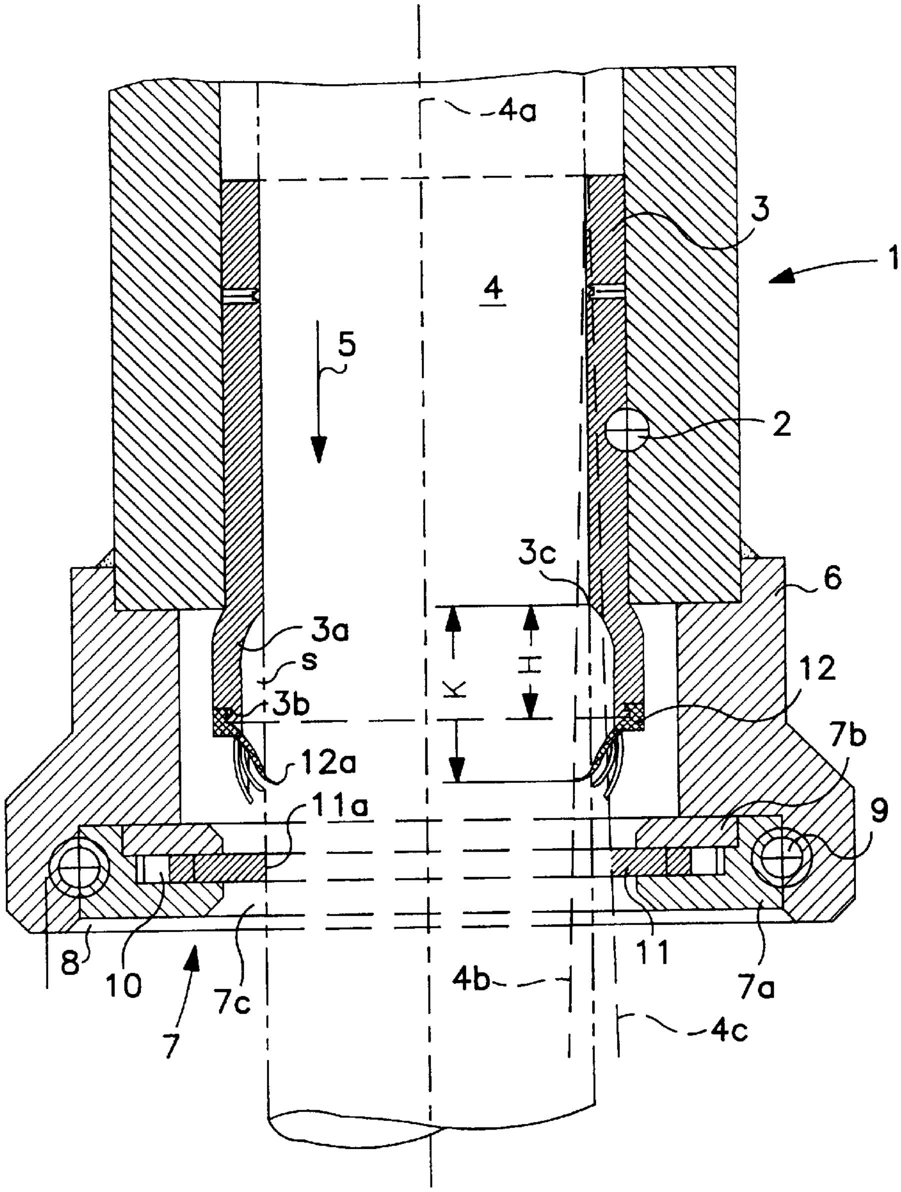
FIG. 1 is a schematic axial sectional view of a terminal part of a percussion tool according to a preferred embodiment of the invention.

Since structural details of the fluid-operated percussion tool have no bearing on the invention, FIG. 1 shows only the terminal (lower) tool portion generally designated at 1 in which a tool bit guide 3 is immovably supported by a pin 2. A tool bit such as a chisel 4 is supported in the guide 3 for reciprocating motion parallel to the longitudinal tool bit axis 4*a*. The motion of the chisel 4 in the impacting direction is designated with the arrow 5.

The possible swiveling motions transversely to the direction 5 executed by the chisel 4 are shown by broken lines 4*b* and 4*c* in a substantially exaggerated manner. A housing part 6 is secured to the tool part 1 as an extension thereof and releasably receives at its frontal end (that is, at the bottom in the illustration) a replaceable structural component 7. For this purpose the housing part 6 is provided with a recess 8 which, as viewed axially, is slightly deeper than the height of the replacement part 7 and whose diameter is adapted to the diameter of the replacement part 7. The parts 6 and 7 are releasably secured to one another by pins 9. The housing part 6 has a central opening which is in general alignment with the tool bit guide 3 and through which the tool bit 4 projects.

The replacement part 7 is composed of a frontal plate 7*a* and a back plate 7*b*. The plates 7*a* and 7*b* are designed such that they have a sufficiently large central aperture 7*c* for the passage of the chisel 4 and define—transversely to the longitudinal axis 4*a*—an annular chamber 10 in which an outer seal formed as a plate-shaped transverse slide 11 is movably supported. Thus, the plates 7*a* and 7*b* form a transverse guide for the transverse slide 11.

The height of the annular chamber 10 measured parallel to the longitudinal axis 4*a* of the tool bit 4 is slightly greater than the thickness of the transverse slide 11 so that the latter may readily slide in radial directions within the annular chamber 10. Thus, as external forces cause the tool bit 4 to execute transverse excursions, the slide 11 moves therewith as a rigid unit relative to the housing part 6.

Figure 1A:
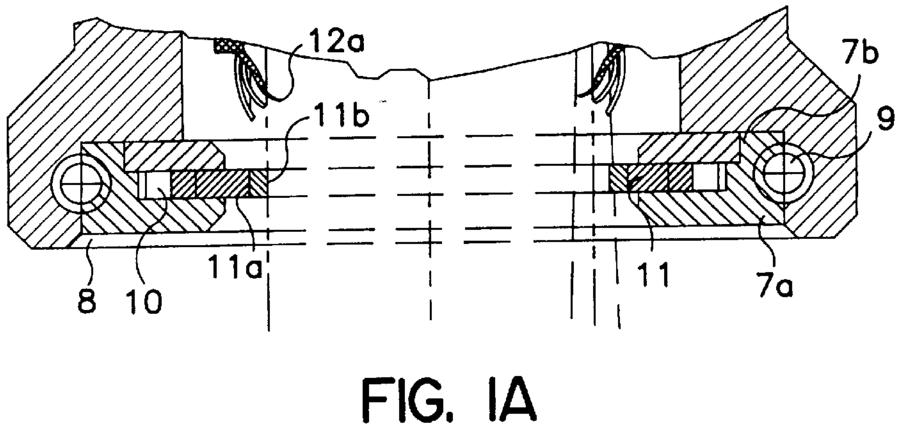
FIG. 1*a* is a fragmentary view similar to FIG. 1, illustrating a variant.

The inner wall 11*a* of the transverse slide 11, defining the central aperture surrounding the tool bit 4 is of radially inwardly convex shape so that transverse displacements of the tool bit 4 (indicated by the lines 4*b* and 4*c*) cannot lead to misalignments (jamming) of the parts 4 and 11. As shown in FIG. 1*a*, as an alternative, radially inwardly of and in contact with the wall 11*a* and elastic sealing ring 11*b* may be provided which continuously lies against the outer face of the chisel 4 and thus forms a further sealing zone in addition to the inner seal 12. Such an arrangement is particularly expedient if the transverse slide proper is made of a rigid material.

The parts 7*a* and 7*b* are attached to one another in a non-illustrated manner; accordingly, the replacement part 7 may be removed and installed as a unit with the transverse slide 11 supported therein in a freely movable manner.

Within the housing part 6, upstream of the transverse slide 11 as viewed in the impacting direction 5, an inner seal 12 is positioned. The inner seal 12 has a sealing lip 12*a* which lies elastically against the chisel 4 externally of the tool bit guide 3 and which serves as the principal stripper of dirt that may penetrate into the housing part 6.

In the illustrated embodiment the inner seal 12 is releasably secured to an extension 3*a* of the tool bit guide 3 by means of a holding groove 3*b*. The extension 3*a* surrounds chisel 4 with a clearance s in the region of the inner seal 12. The clearance s is greater than the largest possible transverse displacement (indicated by the lines 4*b* and 4*c*) of the chisel 4 in that region.

To ensure a highly satisfactory functioning of the inner seal 12 under different operational conditions, the length of the sealing lip 12*a* is so designed that the ratio of its length to the greatest possible transverse displacement of the chisel 4 in the region of the sealing lip 12 is greater than 2.

The stripping zone of the inner seal 12 is so arranged that the distance K of the sealing lip 12*a* from the front edge 3*c* of the tool bit guide 3 is greater than the maximum stroke H of the chisel 4. In this manner it is ensured that the contact zone of the sealing lip 12*a* does not coincide with the guide region of the chisel 4.

As it may be further seen in FIG. 1, the inner seal 12 assumes, with respect to the replacement part 7, a position which, after removal of the part 7, renders the inner seal 12 accessible from the front side of the structural part 6.

Figure 2:
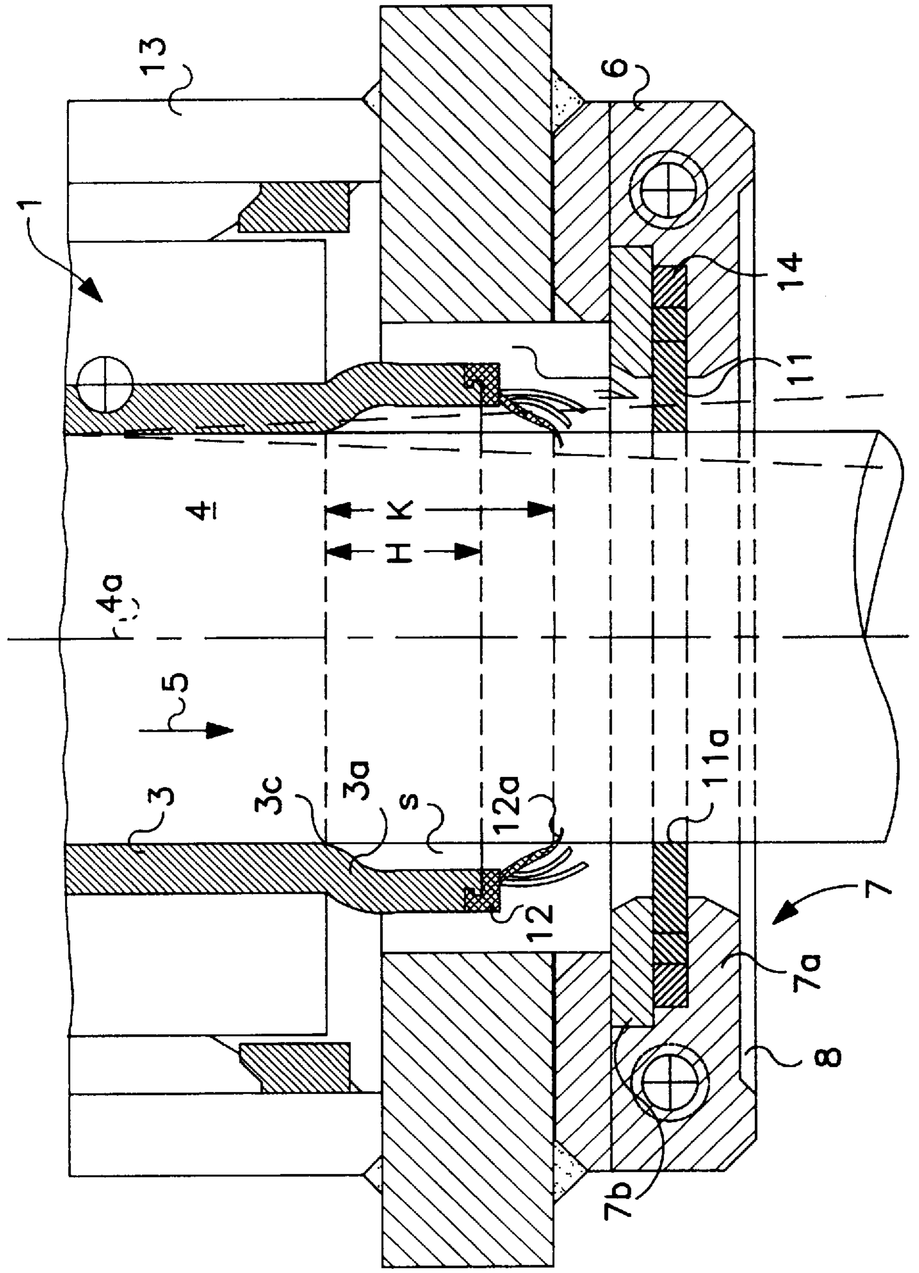
FIG. 2 is a schematic axial sectional view similar to FIG. 1, illustrating another preferred embodiment of the invention.

Departing from the embodiment discussed above in conjunction with FIG. 1, in the variant shown in FIG. 2 the structural part 6 which receives the replacement part 7 is part of an outer housing 13 which surrounds and supports the percussion tool.

Similarly to FIG. 1, only the lower part 1 of the percussion tool is shown in FIG. 2 in addition to the tool bit guide 3, the extension 3*a* and the inner seal 12.

In accordance with the invention, the inner seal 12 may be offset in the impact direction (arrow 5) toward the replacement part 7 to such an extent that its sealing lip 12*a* has only a small axial distance from the transverse slide 11. As a result of this arrangement, the region of the inner seal 12 (after removal of the part 7 and the chisel 4) may be particularly well inspected and is easily accessible.

As a departure from the embodiment illustrated in FIG. 1, the annular chamber 10 which is bounded by the parts 7*a*, 7*b* and 11 is fully occupied by an elastic ring 14. Under the effect of such a lateral, resilient support, the transverse slide 11 seeks to assume a predetermined mid position relative to the longitudinal axis 4*a* of the chisel 4. The resilient support within the replacement part 7 results in a damping of undesired chatter motions and noise generation derived therefrom.

It is to be understood that the passage for the chisel 4 defined by the wall 11*a* of the transverse slide 11, apart from its other configurations, is adapted in size in such a manner to the diameter of the chisel 4 that between the parts 4 and 11 no misalignments (jamming) may occur.

It will be understood that the above description of the present invention is susceptible to various modifications, changes and adaptations, and the same are intended to be comprehended within the meaning and range of equivalents of the appended claims.

What is claimed is:

1. A percussion tool comprising (a) a housing part having a frontal end provided with an opening;

(b) a tool bit guide supported in alignment with said opening;

(c) a tool bit slidably supported in said tool bit guide and projecting from said housing part through said opening; said tool bit having a longitudinal axis and being arranged for a reciprocating motion parallel to said longitudinal axis in an impacting direction and for transverse excursions substantially perpendicular to said longitudinal axis;

(d) a transverse guide attached to said housing part;

(e) an outer seal composed of a transverse slide displaceably received in said transverse guide; said transverse slide having an aperture through which said tool bit passes; said transverse slide and said tool bit being arranged such that said transverse slide and said tool bit move as a unit during the transverse excursions of said tool bit;

(f) an inner seal disposed in said housing part between said transverse slide and said tool bit guide externally thereof; said inner seal resiliently contacting said tool bit; and (g) holding means for positioning said inner seal.

2. The percussion tool as defined in claim 1, further comprising means for replaceably securing said outer seal and said inner seal.

3. The percussion tool as defined in claim 1, wherein said transverse slide is disc-shaped.

4. The percussion tool as defined in claim 1, wherein said transverse slide has an annular wall defining said aperture thereof; said annular wall being radially inwardly convex as viewed in an axial section.

5. The percussion tool as defined in claim 1, wherein said transverse slide and said transverse guide form a replacement component; further comprising means for releasably securing said replacement component to said housing part.

6. The percussion tool as defined in claim 1, wherein said holding means comprises an extension of said tool bit guide; and further wherein said extension surrounds said tool bit with a radial clearance which is greater than a maximum transverse excursion of said tool bit.

7. The percussion tool as defined in claim 1, further comprising an external housing supporting percussion tool components; said housing part being attached to said external housing to form a part thereof.

8. The percussion tool as defined in claim 1, further comprising elastic means disposed in said transverse guide for resiliently supporting said transverse slide in directions transverse to said longitudinal axis of said tool bit.

9. The percussion tool as defined in claim 8, wherein said elastic means comprises an elastic ring disposed in said transverse guide and surrounding said transverse slide.

10. The percussion tool as defined in claim 1, wherein said transverse slide is a rigid unit.

11. The percussion tool as defined in claim 10, wherein said transverse slide has an annular wall defining said aperture thereof; said annular wall being formed at least in part of an elastic material.

12. The percussion tool as defined in claim 10, wherein said transverse slide has an annular wall defining said aperture thereof; further comprising a sealing ring disposed in contact with said annular wall and said tool bit.

13. The percussion tool as defined in claim 1, wherein said inner seal has a sealing lip surrounding and contacting said tool bit.

14. The percussion tool as defined in claim 13, wherein said sealing lip is oriented obliquely to said impacting direction and extends toward said transverse slide.

15. The percussion tool as defined in claim 13, wherein a ratio between a length of said sealing lip and a maximum transverse excursion of said transverse slide is at least between 1 and 3.

16. The percussion tool as defined in claim 13, wherein a distance of said sealing lip from a frontal terminal edge of said transverse guide is greater than a maximum axial displacement of said tool bit.

* * * * *